United States Patent
Svanebjerg et al.

(10) Patent No.: US 8,387,944 B2
(45) Date of Patent: Mar. 5, 2013

(54) COMPENSATED VALVE

(75) Inventors: Elo Svanebjerg, Tappernøje (DK); Martin Højholm Jakobsen, Sorø (DK)

(73) Assignee: Vestergaard Company A/S, Roskilde (DK)

( * ) Notice: Subject to any disclaimer, the term of this patent is extended or adjusted under 35 U.S.C. 154(b) by 617 days.

(21) Appl. No.: 12/440,263

(22) PCT Filed: Sep. 8, 2006

(86) PCT No.: PCT/IB2006/053169
§ 371 (c)(1), (2), (4) Date: Aug. 27, 2009

(87) PCT Pub. No.: WO2008/032144
PCT Pub. Date: Mar. 20, 2008

(65) Prior Publication Data
US 2010/0012867 A1  Jan. 21, 2010

(51) Int. Cl.
*F16K 31/122* (2006.01)
*F16K 31/363* (2006.01)
(52) U.S. Cl. ............ 251/63; 251/63.5; 251/282
(58) Field of Classification Search ....... 251/62, 251/63, 63.5, 63.6, 282
See application file for complete search history.

(56) References Cited

U.S. PATENT DOCUMENTS

| | | | | |
|---|---|---|---|---|
| 2,307,949 A | * | 1/1943 | Phillips | 137/498 |
| 2,726,840 A | * | 12/1955 | Jurs et al. | 251/63.5 |
| 2,759,488 A | * | 8/1956 | Garrett et al. | 137/491 |
| 2,799,466 A | * | 7/1957 | Hickerson | 251/30.03 |
| 3,029,061 A | * | 4/1962 | Hoxworth | 251/63.4 |
| 3,498,331 A | * | 3/1970 | Grune | 137/625.66 |
| 4,565,321 A | * | 1/1986 | Vestergaard | 239/172 |
| 5,375,623 A | | 12/1994 | Weber | |

FOREIGN PATENT DOCUMENTS

WO  WO 94/01709  1/1994

* cited by examiner

*Primary Examiner* — William McCalister
(74) *Attorney, Agent, or Firm* — Stites & Harbison PLLC; Marvin Petry

(57) ABSTRACT

In a valve assembly (1) comprising a valve housing (2), a valve seat (3) and a valve body (4) adapted to fit in closing relationship in said valve seat (3) in a closed position, said housing (2) has an inlet (5) and an outlet (6) for a pressurized fluid, positioned upstream and downstream of the valve members, respectively. The valve has a closed position being maintained by a closing force e.g. from a compression spring (7) and an open position, wherein the valve seat (3) and/or the valve body (4) are moved away from each other by an activating mechanism. A pressure balancing line (11) is provided internally or externally of the housing (2), wherein fluid of the fluid flow downstream of the moveable valve member (3, 4) is in fluid connection with the opposite end of said member, when in use.

3 Claims, 2 Drawing Sheets

COMPENSATED VALVE

TECHNICAL FIELD

The invention relates to a valve assembly to regulate a flow of fluid by adjusting the distance between a valve seat and a valve body, especially used in high-pressure spray guns.

BACKGROUND ART

Such valve assemblies are known from the literature and comprise a valve housing having a valve seat and a valve body adapted to fit together in a closing relationship when in a closed position, and being positioned in the flow path of a fluid, which is being sprayed while the distance between said valve seat and said valve body is gradually increased.

One of the known valve assemblies is illustrated in e.g. EP 0 228 363, wherein the valve is part of a complete spray nozzle assembly, and it comprises a fixed solid valve body and a moveable tubular valve seat having a radial ring-shaped protrusion on the outer surface thereof, which protrusion is retained in a closing position against the valve body due to the axial force of a compression spring acting on the protrusion.

Releasing the closing position by gradually increasing the distance of the valve seat from the valve body allows an increasing flow of spray fluid to pass through the valve.

Said release is provided by forcing a hydraulic fluid into a circumferential chamber on one side of the radial protrusion opposite the compression spring.

The opening force required should be stronger than the combined force from the compression spring and the pressurized spray fluid acting on the cross sectional area of the tubular valve seat.

This means that the hydraulic fluid should provide a rather demanding force in order to initiate opening the valve, whereafter the hydraulic force needs to be decreased very fast or else the valve will immediately open fully. This means that an on-off valve has been provided rather than a linear regulation valve.

DISCLOSURE OF THE INVENTION

It is an object of the present invention to provide a valve assembly that regulates a flow in a linear manner and with less force.

According to the invention, this object has been solved by an embodiment of a valve assembly comprising a valve housing, a valve seat formed as a movable valve member and a valve body adapted to fit in closing relationship into said valve seat in a closed position; said housing having an inlet and an outlet for a pressurized fluid, positioned upstream and downstream of the valve seat, respectively; said closed position being maintained by a closing force, e.g. from a compression spring; and having an open position, wherein the valve seat and/or the valve body are forced away from the other one by an activating mechanism. This solution is characterized by a pressure balancing line for the moveable valve member, wherein fluid of the fluid flow downstream of the valve seat is in fluid connection with the opposite end of the valve member, when in operation.

In an advantageous embodiment of the invention, the activating mechanism is a hydraulic fluid forced into an annular chamber defined between the inner wall of the valve housing and the outer surface of a tubular valve member, whereof an integral radially protruding flange is forced axially in one direction by the spring and in the opposite direction by the hydraulic fluid in order for the valve seat to close or open the gap between the valve seat and the valve body, respectively.

The activating mechanism could also be a hydraulic fluid forced into an annular chamber defined between the inner wall of the valve housing and the outer surface of a valve body, whereof an integral radially protruding flange is forced axially in one direction by the spring and in the opposite direction by the hydraulic fluid in order for the valve seat to close or open the gap between the valve body and the valve seat.

Furthermore, in an embodiment of the invention wherein the balancing line provides fluid connection between the outlet area downstream of the valve seat and a balancing cavity upstream of the valve seat, said cavity surrounds the upstream end of the moveable valve member, thereby balancing the two ends of the moveable valve member.

In yet another advantageous embodiment of the invention, the sectional area of the end of the tubular valve member proximate to the valve member equals the sectional area of the balancing cavity or chamber defined between an outer periphery of the tubular valve member and the valve housing distal from the valve member.

BRIEF DESCRIPTION OF THE DRAWINGS

After having defined how the invention fulfills the object and provides a valve assembly which is easy and precise to regulate from being fully closed to fully open, a detailed description of a preferred embodiment will be presented, reference being made to the accompanying drawing, in which.

DETAILED DESCRIPTION

Figure 1:
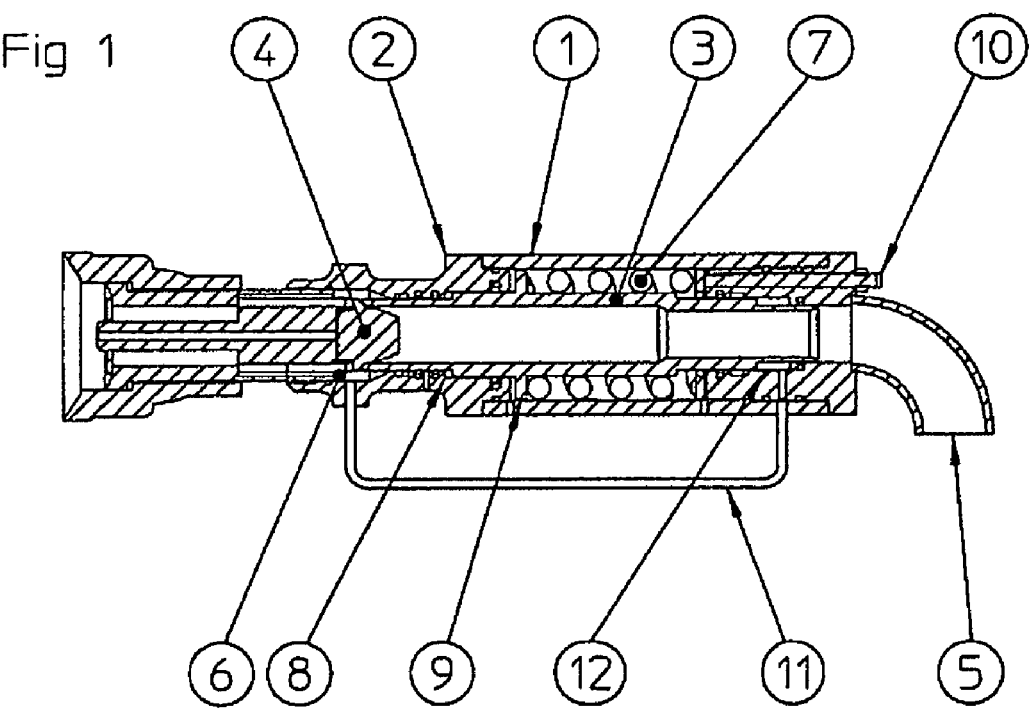
FIG. 1 is an axial cross section of a valve assembly according to the invention, being in its closed position.
Figure 2:
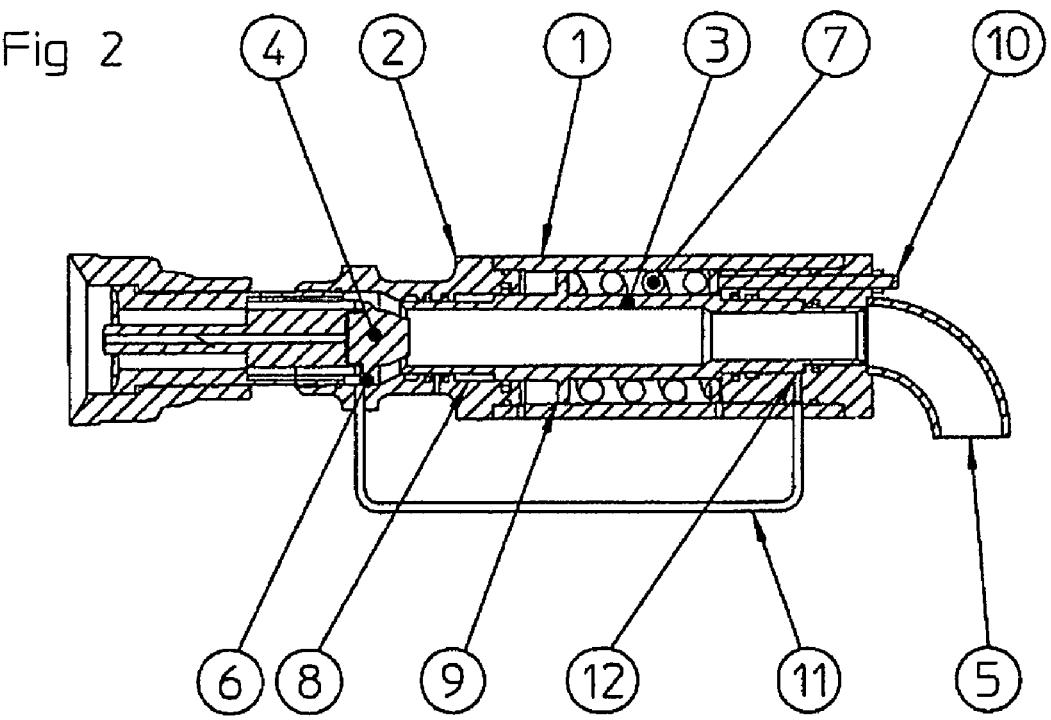
FIG. 2 is an axial cross section of a valve assembly according to the invention, being in its open position.

FIG. 1 and FIG. 2 show a valve assembly 1 being adapted for use in a spray gun structure (not shown), wherein the valve assembly 1 comprises a valve housing 2 having a valve seat formed as part of a movable member, both referred to collective as 3, and a fixed valve body 4 adapted to fit in closing relationship in said moveable valve member. The valve housing 2 has an inlet 5 and an outlet 6 for a pressurized fluid, said inlet and outlet, respectively, being positioned upstream and downstream of the movable valve member.

The closed position is maintained by a closing force of a compression spring 7 which is located in a spring space of the housing. An open position, wherein the valve seat is forced away from the valve body, is provided by means of an activating mechanism comprising a hydraulic fluid which is forced into an annular activation cavity 8 defined radially between the outer surface of the axially moveable valve member 3 and the inner surface of the valve housing 2 and axially between an inner stop in the housing and a shoulder on the valve member, thereby moving the valve seat 3 axially away from the valve body 4 and allowing a fluid flow to pass through the tubular valve member 3 and around the valve body 4 to the outlet 6.

The moveable valve member 3 is provided with a circumferential protrusion 9 acting as a stop shoulder for one end of the compression spring 7, while the other end thereof is retained by one or more pre-stressing bars 10. The opposite face of the protrusion 9 is stopped against an inner shoulder on the valve housing 2, avoiding that the valve member 3 and the compression spring 7 leave the valve housing 2.

A balancing line 11 establishes fluid connection between an area in the outlet 6 and a balancing cavity 12 provided near the end of the moveable valve seat member and defined radially between the outer surface thereof and the inner surface of the valve housing 2, and axially between an upstream stop in the valve housing 2 and a shoulder on the valve member 3.

In operation, a pressurized spray fluid is attached to the inlet 5 of the valve assembly 1 and is retained in the inlet pipe and the moveable valve member 3, which in itself is retained in its closed position by the spring force 7.

When the spray gun is to be activated, a hydraulic fluid is forced into the activation cavity 8, thereby displacing the valve seat axially away from the valve body allowing the pressurized spray fluid to pass through the gap between the valve seat 3 and the valve body 4 and into the outlet area 6. When the fluid is in the outlet 6, the pressure of the fluid flow will act on the valve member 3, but at the same time the pressure will be balanced by the pressure at the other end of the balancing line, so that the moveable valve member 3 is in a balanced state and the hydraulic fluid is required only to counteract the spring force 7.

As long as the annular sectional areas of the valve and the balancing cavity, respectively, are equal, a balanced state of the valve member could be retained.

The present embodiment has been described with the valve seat 3 being the moveable member and the valve body 4 being the fixed member. However, there is no reason why in another embodiment the roles are opposite.

Still the main advantage obtained is a balancing line providing for pressure compensation for the moveable valve member securing a manner to regulate the fluid flow in a linear way from open to closed positions with a moderate effort.

Any type of standard nose cone could be attached to the outlet end 6 of the valve assembly in order to keep good control of the spraying pattern.

Also other means than hydraulic fluid of activating the valve, e.g. mechanical means, could be conceived.

The invention claimed is:

1. A valve assembly comprising a valve housing, the valve assembly having an open position and a closed position, a valve seat formed on a movable valve member, and a valve body adapted to fit in closing relationship on said valve seat in the closed position of the valve assembly; said housing having an inlet and an outlet for a pressurized fluid, positioned upstream and downstream of said moveable valve member, respectively, the valve housing having a spring space, said closed position of the valve assembly being maintained by a closing force from a compression spring located in the spring space, wherein the valve seat and the valve body can be moved away from each other by an activating mechanism to the valve assembly open position, wherein said valve assembly further comprises a pressure balancing line through which fluid downstream of the moveable valve member is in fluid connection with an upstream part of said valve member, the balancing line providing a fluid connection between an outlet area downstream of the movable valve member and a balancing cavity, the balancing cavity being separate from and not in fluid communication with the spring space, said balancing cavity surrounding the movable valve member and being defined radially between an outer surface of the movable valve member and, an inner surface of the valve housing and axially between, on its upstream end, a stop in the valve housing and, on its downstream end, a radially extending shoulder on the valve member.

2. A valve assembly according to claim 1, wherein the activating mechanism is a hydraulic fluid forced into an annular activation cavity defined between an inner wall of the valve housing and an outer surface of said valve member, said valve member being tubular, and wherein an integral radially protruding flange is forced axially in one direction by the spring and in the opposite direction by the hydraulic fluid, in order for the valve seat to close or open a gap between the valve seat and the valve body, respectively.

3. A valve assembly according to claim 1, wherein the cross sectional area of an end of the movable valve member proximate to the valve body equals the cross sectional area of the balancing cavity.

* * * * *